(12) United States Patent  
Living

(10) Patent No.: US 7,668,367 B2
(45) Date of Patent: Feb. 23, 2010

(54) IMAGE PROCESSING FOR GENERATING A REPRESENTATIVE COLOR VALUE INDICATIVE OF A REPRESENTATIVE COLOR OF AN IMAGE SUB-AREA

(75) Inventor: Jonathan Living, Nr. Stourbridge (GB)

(73) Assignee: Sony United Kingdom Limited, Weybridge (GB)

( * ) Notice: Subject to any disclaimer, the term of this patent is extended or adjusted under 35 U.S.C. 154(b) by 669 days.

(21) Appl. No.: 11/503,985

(22) Filed: Aug. 15, 2006

(65) Prior Publication Data

US 2007/0076921 A1 Apr. 5, 2007

(30) Foreign Application Priority Data

Sep. 30, 2005 (GB) .................................. 0519976.5

(51) Int. Cl.
*G06K 9/00* (2006.01)
*G06K 9/36* (2006.01)
*G06K 9/46* (2006.01)

(52) U.S. Cl. ...................... 382/164; 382/118; 382/284

(58) Field of Classification Search ............... 382/103, 382/115–118, 162, 164, 167, 168, 173, 190, 382/218–220, 254, 260–264, 276, 277, 284; 348/47, 207.99; 375/240.01, 240.12, 240.16
See application file for complete search history.

(56) References Cited

U.S. PATENT DOCUMENTS

| | | | |
|---|---|---|---|
| 5,903,303 A * | 5/1999 | Fukushima et al. ........... 348/47 |
| 6,449,389 B1 * | 9/2002 | Schweid ...................... 382/164 |
| 6,895,124 B1 * | 5/2005 | Kira et al. .................... 382/260 |
| 6,917,692 B1 | 7/2005 | Murching et al. |
| 7,072,525 B1 * | 7/2006 | Covell ......................... 382/261 |
| 2002/0012183 A1 * | 1/2002 | Kovvuri et al. ............. 359/896 |
| 2002/0154695 A1 | 10/2002 | Cornog et al. |
| 2005/0013479 A1 * | 1/2005 | Xiao et al. ................... 382/159 |
| 2007/0076921 A1 * | 4/2007 | Living ......................... 382/118 |

FOREIGN PATENT DOCUMENTS

| | | |
|---|---|---|
| EP | 0 967 574 A2 | 12/1999 |
| EP | 1 063 849 A1 | 12/2000 |
| GB | 2 386 277 A | 9/2003 |
| WO | WO 2004/051553 A2 | 6/2004 |
| WO | WO 2005/116910 A2 | 12/2005 |

* cited by examiner

*Primary Examiner*—Amir Alavi
(74) *Attorney, Agent, or Firm*—Oblon, Spivak, McClelland, Maier & Neustadt, L.L.P.

(57) ABSTRACT

A method of processing successive images of a video signal to generate a representative color value indicative of a representative color of an image sub-area. The method includes detecting a color property of the image sub-area in a current image, generating a filtered color property in respect of the current image by combining a color property for the current image with a filtered color property derived in respect of a corresponding sub-area of a previous image, and deriving the representative color value in dependence on a difference between the color property of the sub-area of the current image and the filtered color property.

15 Claims, 7 Drawing Sheets

| -1 | 0 | +1 |
|---|---|---|
| -2 | 0 | +2 |
| -1 | 0 | +1 |

| +1 | +2 | +1 |
|---|---|---|
| 0 | 0 | 0 |
| -1 | -2 | -1 |

IMAGE PROCESSING FOR GENERATING A REPRESENTATIVE COLOR VALUE INDICATIVE OF A REPRESENTATIVE COLOR OF AN IMAGE SUB-AREA

BACKGROUND OF THE INVENTION

1. Field of the Invention

This invention relates to image processing.

2. Description of the Prior Art

An example problem will be described in the field of face detection, but the invention is generally applicable to detection of different types of objects such as faces, cars, animals and the like, and to image processing in general.

Various object detection techniques, for example for human face detection, have been proposed. It is generally possible to detect a human face with a reasonably high degree of certainty in a captured image (e.g. a frame of a video signal).

Moving further, it is desirable to be able to associate together detected faces in different images, so as to generate data representing, for example, how long a single face stayed in view of a camera (a so-called dwell time). This is of use in retail applications (for example, to detect how long a customer browsed a particular shelf in a store) or security applications. Techniques for achieving this are described in WO2004/051553 and generally involve matching face positions and face properties between temporally adjacent images, with an allowance for reasonable inter-image movement.

Going further still, it would be desirable to be able to link together face tracks obtained at different times and/or from different cameras. In order to do this, it is often necessary to compare image properties (e.g. color properties) of image areas between the different tracks, in order to arrive at a decision as to whether the tracks relate to the same person or different people.

However, because the tracks could well have been generated by different cameras, or under different lighting conditions, even where the person is indeed the same between tracks, the results of such a comparison can indicate otherwise.

SUMMARY OF THE INVENTION

An object of the present invention is to provide an improved image processing technique.

This invention provides a method of processing successive images of a video signal to generate a representative color value indicative of a representative color of an image sub-area, the method comprising the steps of:

(i) detecting a color property of the image sub-area in a current image;

(ii) generating a filtered color property in respect of the current image by combining a color property for the current image with a filtered color property derived in respect of a corresponding sub-area of a previous image; and (iii) deriving the representative color value in dependence on a difference between the color property of the sub-area of the current image and the filtered color property.

The invention addresses the problem identified above by providing techniques to normalise images using data collected from within the images themselves. By deriving a representative color value with reference to a filtered mean color property, color comparisons between images made using that representative color value can have a greater validity than comparisons made using the raw color properties of the images.

Various further aspects of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

The present description will refer to the detection of faces; however, it will be appreciated that the techniques are applicable to other types of object for detection.

A main aim of face recognition techniques is to provide algorithms for matching people, either within pictures taken by the same camera or across multiple cameras. In the present embodiments, a primary method for achieving this is the use of a "face similarity" algorithm such as that described in PCT/GB2005/002104. Areas for possible improvement of that or other similarity algorithms have been identified. These include providing an improved level of robustness to variations in image lighting.

A method of face similarity is described. This method uses a set of eigenblock-based attributes to represent each face.

Another method of matching people is then described, which is to use cues from the color of their clothing, hair and face. Such a method, referred to as "color similarity," was also developed on this project, with the aim of aiding face similarity.

A further method involves the use of texture similarity and segmentation cues.

It is noted that these algorithms and methods can be used together in the various possible permutations. They are also applicable for use in conjunction with face detection techniques other than those described in this application and in the cited references.

Whatever algorithm is used, the context of the face similarity algorithm within the overall face detection and tracking system can be summarised as follows, with reference to FIG. 1.

Figure 1:
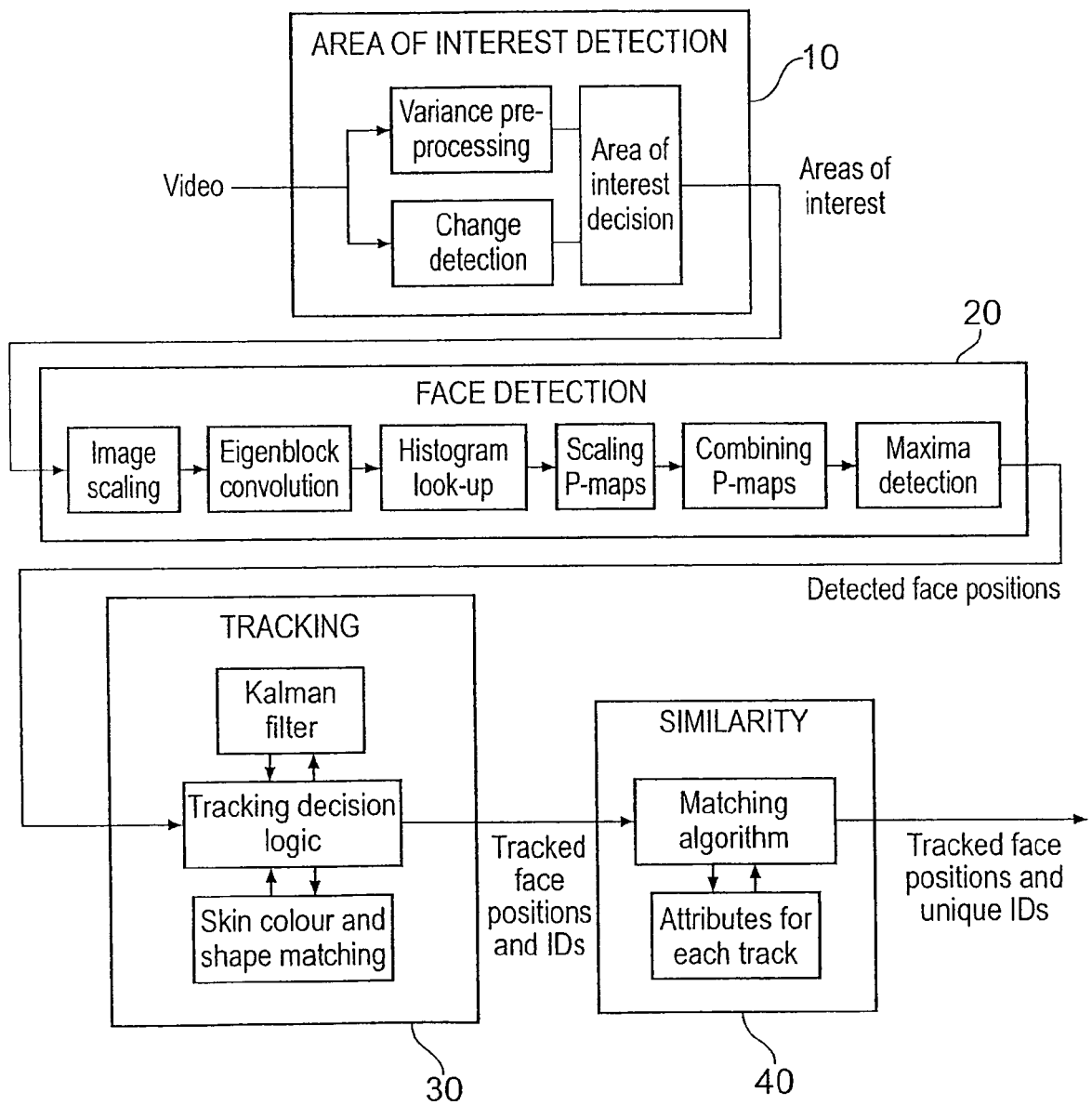
FIG. 1 schematically illustrates a face detection, tracking and similarity detection process.

FIG. 1 schematically illustrates an overall process, starting from incoming video (recorded or newly captured), to provide tracked face positions and face identifiers (IDs). In other words, the arrangement detects instances of a first object part (in this example, a face) in test images. The arrangement of FIG. 1 can be carried out by hardware, computer software running on an appropriate computer, programmable hardware (e.g. an ASIC or FPGA), or combinations of these. Where software is involved, this may be provided by a providing medium such as a storage medium (e.g. an optical disk) or a transmission medium (e.g. a network and/or internet connection).

The video is first subjected to so-called area of interest detection 10, including variance pre-processing and change detection leading to an area of interest decision. The area of interest detection is described in WO2004/05 1553 and is capable of defining, within each image of the video signal, a sub-area in which the presence of a face is more likely.

A face detection process 20 then operates on each image, with reference to the detected areas of interest. Again, the process 20 is described in WO2004/051553. The output of the face detection process comprises face positions within images of the video signal.

Face tracking 30 attempts to match faces from image to image, so as to establish so-called tracks each representing a single face as it moves from image to image. Each track has a track identifier (ID).

After face tracking, each new track is compared with all existing tracks using a matching algorithm in a similarity detection process 40. Here, the similarity algorithm is working in respect of sets of test images (the tracks) in which similar instances of a first object part (a face in this example) have been detected. The output of the matching algorithm for each new track is a set of similarity distance measures. A similarity distance measure is a figure indicating how different two tracks are; ideally, the smaller the distance, the more likely it is that the tracks belong to the same individual. The distance measures can then be thresholded in order to decide whether the new track should be linked to an existing track.

In the experiments to be described below, the matching algorithms were implemented in a "similarity server." This software allowed face detection and tracking to be performed on several camera streams and similarity to be carried out on the faces detected in all streams concurrently. To allow the effect of various different similarity thresholds to be determined, similarity scores were output from the server and the matching was performed offline. However, the server also allows matching to be performed online so that a full demonstration of similarity using face and/or other cues may be given.

In the experiments to be described below, the performance of the similarity detection system was measured by trying to estimate the dwell time distribution of people standing in front of a single camera. The reasons and method for doing this are described below.

Tracking and Similarity System

Dwell Time Metric

Shop owners are interested in knowing the amount of time customers spend in front of an advertisement. A rough estimation of this can be obtained from the output of face detection and tracking, i.e. the length of tracks. However such an estimation would be inaccurate because usually a few tracks are generated for just one person. This happens for example if the person moves in and out of the camera view or turns away from the camera. The way to link together these broken tracks is by using a matching algorithm. The dwell time can then be more accurately estimated as the total length of linked tracks.

Experimental Data

Four video sequences were recorded in different locations using Sony™ SNC-RZ30™ network cameras at the highest resolution available (680×480 pixels). Over thirty people were asked to walk up to the camera and look into it and then move around a little.

After face detection and tracking on these sequences, one or more tracks were obtained for each person at each camera. When more than one track is obtained for one person at the same camera, the aim of the similarity algorithm is to link together these tracks.

Dwell Time Distribution

In order to obtain an overview of how long people spent in front of a camera, a dwell time distribution can be plotted. The dwell time distribution is obtained by dividing the range of dwell times into equal-sized bins. Then for each bin, the number of people-detections that fall into the bin are counted and plotted on the vertical axis.

Figure 2:
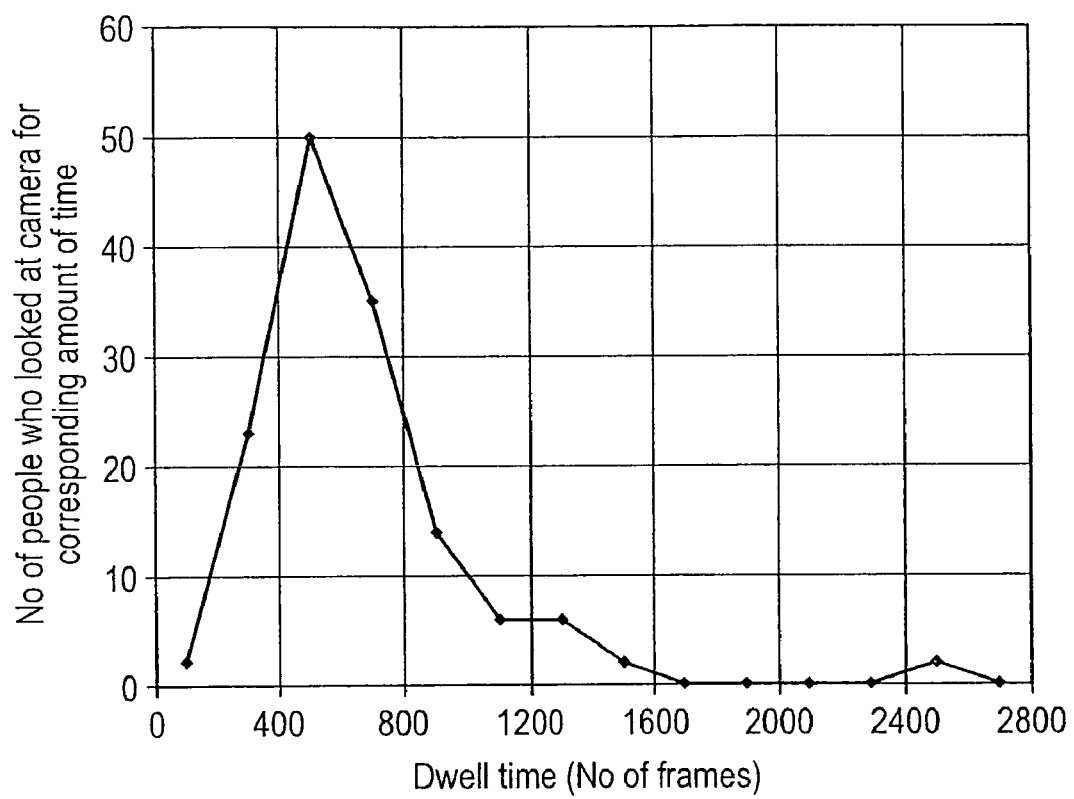
FIG. 2 schematically illustrates manually-derived dwell time information.

In FIG. 2, the dwell time distribution obtained with this experiment is shown. Face detection and tracking was performed on the recorded video sequences. The resulting tracks were manually linked if they belonged to the same person. The range of dwell times for which the distribution is plotted is from 1 frame to 2800 frames. Each bin is of size 200 frames. For example, if someone looks at the camera for 150 frames, that person is counted for the first bin. The maximum count (50 people) occurs for the third bin. This means that the majority of people looked at the camera for between 401 and 600 frames. The dwell time distribution is also shown in tabular form in Table 1 below.

Figure 3:
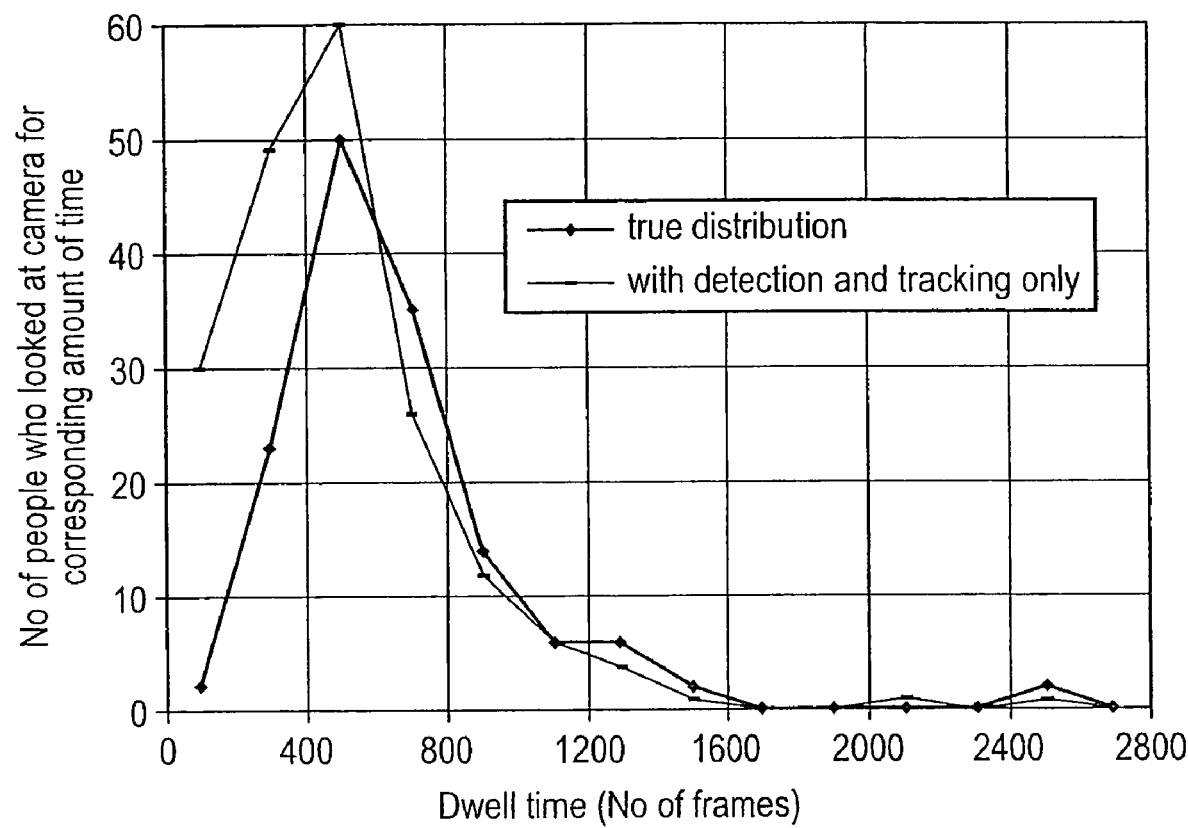
FIG. 3 schematically compares true dwell time information with dwell time information obtained from previously proposed face detection and tracking techniques.

As a comparison, in FIG. 3, the dwell time distribution after face detection and tracking only is shown. The "true distribution" obtained manually and shown in FIG. 2, is also plotted. As can be seen, the dwell times obtained using only face detection and tracking would be merely an approximation to the true situation.

TABLE 1

True dwell time distribution for recorded experimental data.

| Dwell time (No of frames) | No of people who looked at camera for corresponding amount of time |
|---|---|
| 1-200 | 2 |
| 201-400 | 23 |
| 401-600 | 50 |
| 601-800 | 35 |
| 801-1000 | 14 |
| 1001-1200 | 6 |
| 1201-1400 | 6 |
| 1401-1600 | 2 |
| 1601-1800 | 0 |
| 1801-2000 | 0 |
| 2001-2200 | 0 |
| 2201-2400 | 0 |
| 2401-2600 | 2 |
| 2601-2800 | 0 |

Calculating Dwell Time After Tracks are Linked Using Similarity Algorithm

As seen above, tracks get linked if the similarity distance between them is less than a certain threshold. Once tracks are linked into a track set, the dwell time for that track set is the sum of the lengths of the tracks belonging to the track set.

Figure 4:
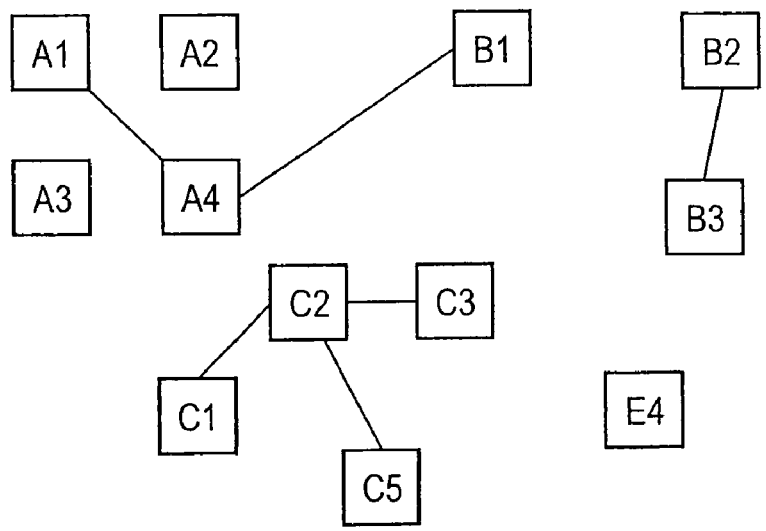
FIG. 4 schematically illustrates a number of face tracks.

FIG. 4 shows an example set of tracks (A1, A2, ... E4) for 4 different people, A, B, C and E, together with example links between tracks for which the similarity distance is below the required threshold. Tracks C1, C2, C3 and C5 are correctly linked as they belong to the same person (Person C). Track E4 remains correctly unlinked as person E has one single track. Tracks A2 and A3 should have been linked to the other tracks belonging to person A. Track A4 is correctly linked to track A1 but incorrectly linked to track B1.

When track sets contain all the tracks for one person and no tracks for another person, the dwell time obtained is guaranteed to be correct as well, i.e. for persons C and E the correct dwell times are obtained. For the rest of the track sets generated using the similarity algorithm, the dwell times are, most likely, wrong. These incorrect dwell times cause the automatically obtained dwell time distribution to be different from the actual dwell time distribution. In the next section, it is explained how the automatically generated dwell time distribution is compared to the actual dwell time distribution in order to compute the final dwell time metric which can be used to evaluate the performance of the similarity algorithm.

TABLE 2

Table showing actual track sets and track sets obtained using the similarity algorithm.

| Real track sets | Track sets obtained using similarity algorithm |
| --- | --- |
| A1, A2, A3, A4 | A1, A4, B1 |
| B1, B2, B3 | A2 |
| C1, C2, C3, C5 | A3 |
| E4 | B2, B3 |
| | C1, C2, C3, C5 |
| | E4 |

Comparing Dwell Time Distributions

Dwell time distributions are compared by calculating the root mean squared error between the two distributions.

$$RMS = \sqrt{\frac{\sum_{b=1}^{no\_of\_bins}(Distribution1_b - Distribution2_b)^2}{no\_of\_bins}}$$

Face Similarity

Techniques for detecting similarity will now be described.

Calculating Attributes

Figure 5:
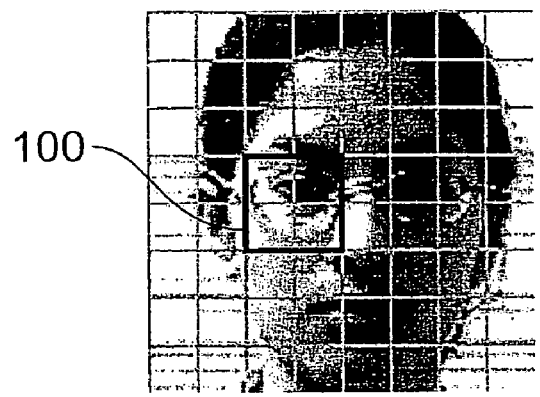
FIG. 5 schematically illustrates the division of a face into blocks.

Each face stamp (size=64×64 pixels) is divided into overlapping blocks of size 16×16 pixels, where each block overlaps its neighbours by 8 pixels, as shown in FIG. 5. (An example 16×16 block 100 is shown in dark line; the white lines represent 8-pixel boundaries). Each block is first normalised to have a mean of zero and a variance of one. It is then convolved with a set of 10 eigenblocks to generate a vector of 10 elements, known as eigenblock weights (or attributes). The eigenblocks themselves are a set of 16×16 patterns computed so as to be good at representing the image patterns that are likely to occur within face images. The eigenblocks are created during an offline training process, by performing principal component analysis (PCA) on a large set of blocks taken from sample face images. Each eigenblock has zero mean and unit variance. As each block is represented using 10 attributes and there are 49 blocks within a face stamp, 490 attributes are needed to represent the face stamp.

In the present system, thanks to the tracking component, it is possible to obtain several face stamps which belong to one person. In order to take advantage of this, attributes for a set face stamps are used to represent one person. This means that more information can be kept about the person compared to using just one face stamp. The present system uses attributes for 8 face stamps to represent one person. The face stamps used to represent one person are automatically chosen as described below.

Comparing Attributes To Produce Similarity Distance Measure

To calculate the similarity distance between two face stamp sets, each of the face stamps of one set is first compared with each face stamp of the other set by calculating the mean squared error between the attributes corresponding to the face stamps. 64 values of mean squared error are obtained as there are 8 face stamps in each set. The similarity distance between the two face stamp sets is then the smallest mean squared error value out of the 64 values calculated.

Thus if any of the face stamps of one set match well with any of the face stamps of the other set, then the two face stamp sets match well and have a low similarity distance measure.

Selection of Stamps for the Face Stamp Set

In order to create and maintain a face stamp set, 8 face stamps are selected from a temporally linked track of face stamps. The criteria for selection are as follows:

The stamp has to have been generated directly from a frontal face detection rather than being tracked in some other way that may be subject to increased positional error.

Once the first 8 stamps have been gathered, the mean squared error between each new stamp available from the track and the existing face stamps are calculated as in the above section. The mean squared error between each face stamp in the track with the remaining stamps of the track are also calculated and stored. If the newly available face stamp is less similar to the face stamp set than an existing element of the face stamp set is to the face stamp set, that element is disregarded and the new face stamp is included in the face stamp set. Stamps are chosen in this way so that the largest amount of variation available is incorporated within the face stamp set. This makes the face stamp set more representative for the particular individual.

If fewer than 8 stamps are gathered for one face stamp set, this face stamp set is not used for similarity measurement as it does not contain much variation and is therefore not likely to be a good representation of the individual.

Face Registration

The face similarity algorithm described above requires faces to be well registered to have the best chance of matching faces with high accuracy. The face detection component of the system does not generate face locations and sizes with a high degree of accuracy as it has to be general enough to detect many types of faces. Therefore, an important intermediate stage between face detection and face similarity is face registration, i.e. translate, rotate and zoom each detected face such that the face features coincide for all face stamps.

A detection-based face registration algorithm is used. It involves re-running the face detection algorithm 20 with a number of additional scales, rotations and translations in order to achieve more accurate localisation. The face picture stamp that is output from the original face detection algorithm is used as the input image.

A special, more localised version of the face detection algorithm can be used for the registration algorithm. This version is trained on faces with a smaller range of synthetic variations, so that it is likely to give a lower face probability when the face is not well registered. The training set has the same number of faces, but with a smaller range of translations, rotations and zooms.

Various similarity tests will now be described, along with possible combinations of the tests. These tests have in common that they involve detecting and comparing attributes of a second object part (e.g. a body part) whose size and position are determined by a predetermined size and orientation with respect to the detected first object part (the face) in the respective image.

Color Similarity

The color similarity algorithm is designed to discriminate between forward-facing subjects whose faces have been detected in a live color video sequence by comparing both chrominance and luminance data for areas of the body around the head and upper torso. It can be used independently to face similarity or in combination. In either case, its position within the overall face detection and object tracking system is the same as face similarity's, as described above.

Areas Of Color Analysis

Figure 6:
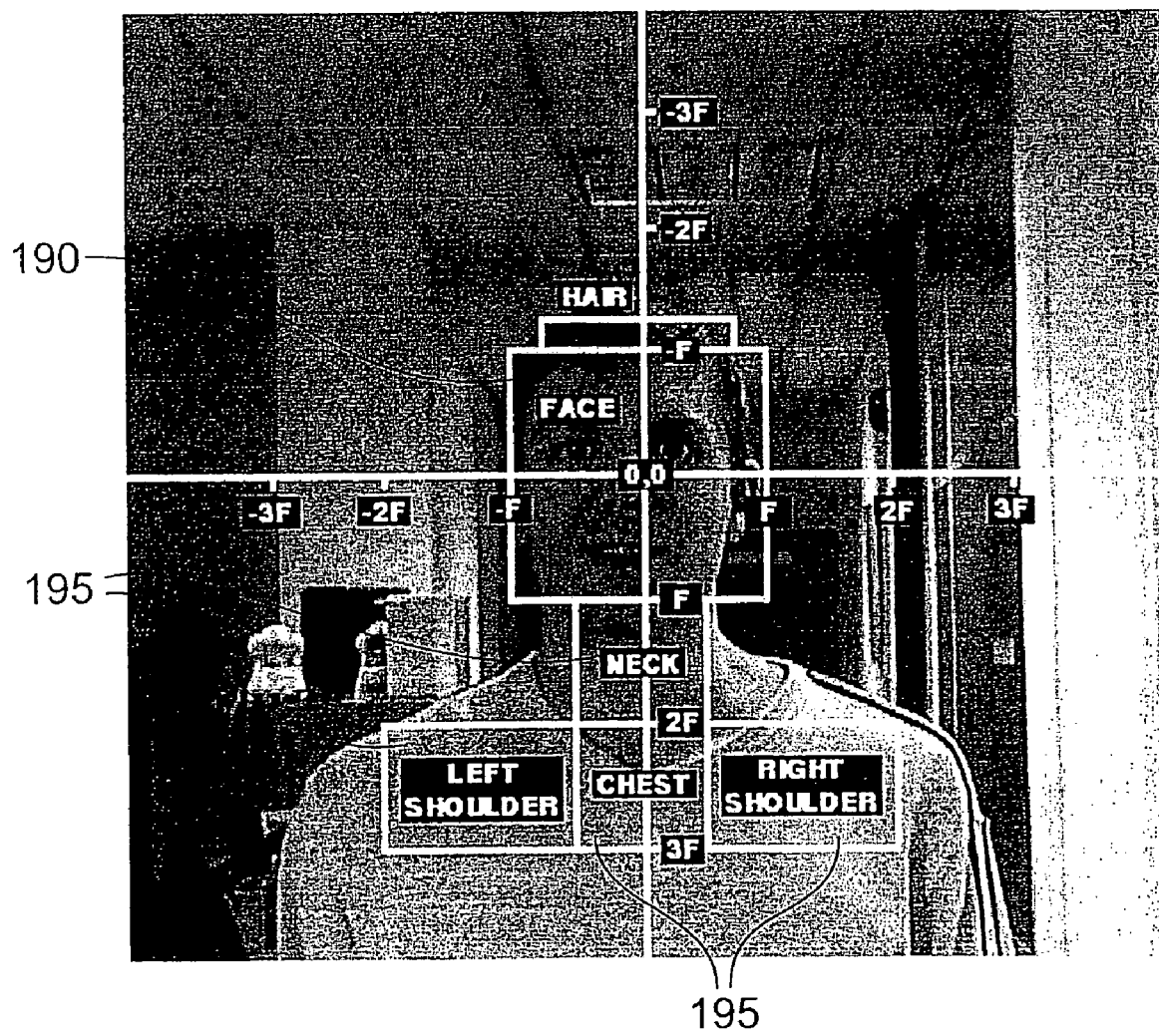
FIG. 6 schematically illustrates color similarity areas.
Figures 7, 8A, 8B:
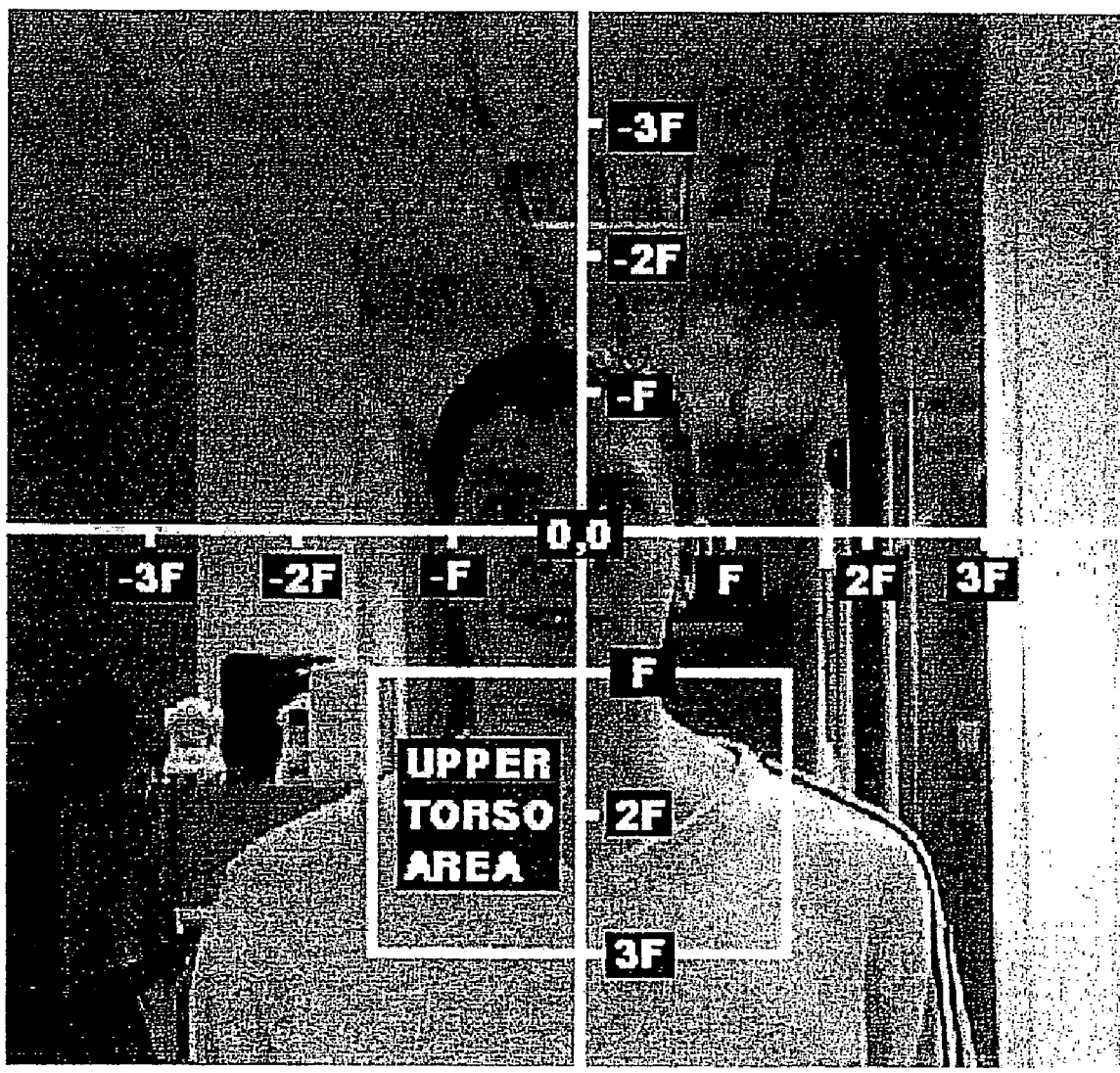
FIG. 7 schematically illustrates texture similarity areas.
FIGS. 8a and 8b schematically illustrate Sobel operator Gx and Gy kernel coefficients.
Figure 10:
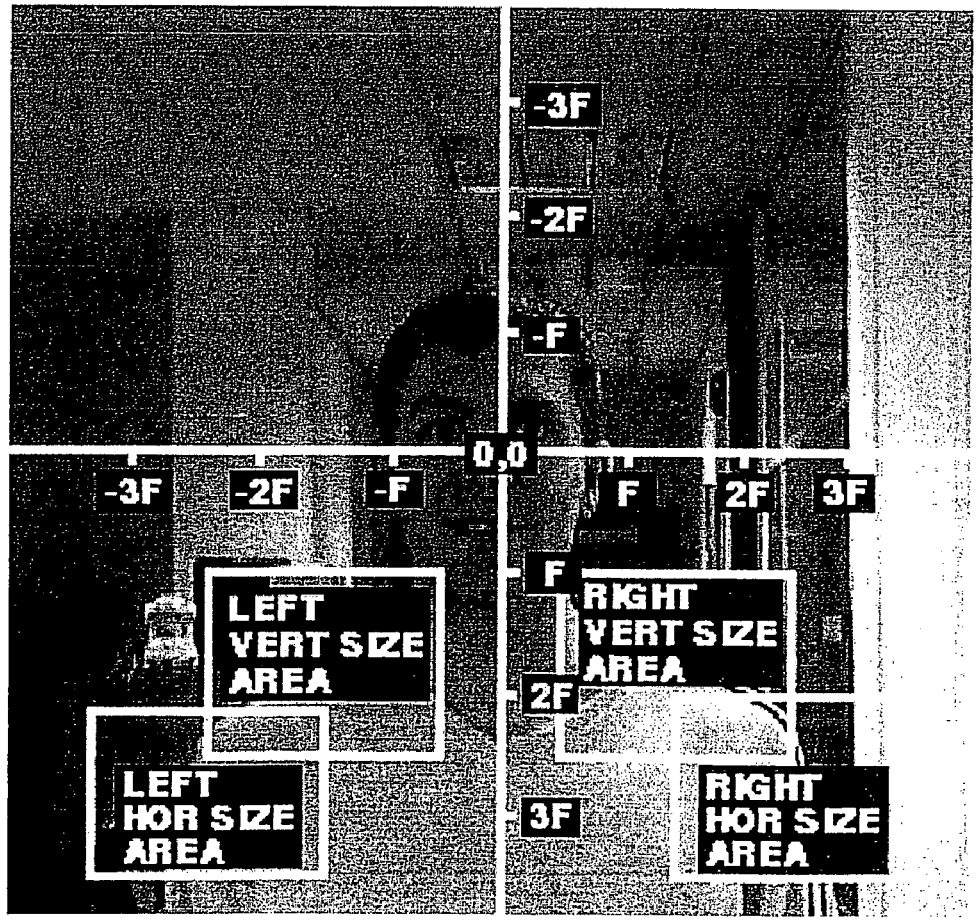
FIG. 10 schematically illustrates geometric similarity areas.

Six areas of the body are used for color analysis, as illustrated schematically in FIG. 6. These are: hair, face, neck, chest, left shoulder and right shoulder. Second object areas 195 are defined with respect to a detected first object area 190. (The arrangements for FIGS. 7 and 10 are of course similar in this respect). The size and position of each area of analysis are expressed relative to size and position of the subject's face using simple rectangular co-ordinates. Assuming the face centre is (0,0), the face size is the same in X and Y and extends from −F to +F (F is the half range value) and that larger values of Y reference point further down the torso away from the head, the co-ordinates for each area of analysis are as shown in Table 3:

TABLE 3

Upper torso areas of analysis for color similarity.

| Upper torso area | Left edge (X) | Right edge (X) | Top edge (Y) | Bottom edge (Y) |
|---|---|---|---|---|
| Hair | −0.75F | 0.75F | −1.25F | −F |
| Face | −F | F | −F | F |
| Neck | −0.5F | 0.5F | F | 2F |
| Chest | −0.5F | 0.5F | 2F | 3F |
| Left shoulder | −2F | −0.5F | 2F | 3F |
| Right shoulder | 0.5F | 2F | 2F | 3F |

The upper torso template shown in FIG. 6 varies in proportion to the detected face size. Even if a subject is largely unmoving in a live video sequence, marginal face detection probabilities at two or more consecutive scales will compete to be the strongest detection, causing rapid changes in template positioning and size by the ratio $\sqrt[4]{2}(\approx 1.189)$. The need to segment the upper torso from the scene to cope with unstable template positioning was largely avoided by the choice of a robust color measurement technique.

Color Measurement

The method used to extract color information from each of the analysis areas was developed so as to be substantially robust to template misalignment and lighting effects.

The input video is converted to YCbCr color space if required and is scaled to be in the range 0 to 1.0, so as to be independent of the number of bits of precision originally used to represent the data.

For each of the six areas of analysis, a two-dimensional chrominance histogram of N Cb bins*N Cr bins of equal size is constructed for each frame of video in which the same (tracked) face appears. N is typically chosen as 50, however values in the range 20 to 100 have also been trialled to reduce and increase color selection accuracy respectively.

Each bin in the current single frame histogram for each of the six areas of analysis updates a corresponding bin in a rolling average histogram according to Equation 1.

$$\text{Avg.Histogram}(n)|_{Cb\,Bin,Cr\,Bin} = 0.02 \text{Frame Histogram}(n)|_{Cb\,Bin,Cr\,Bin} + 0.98 \text{Avg.Histogram}(n-1)|_{Cb\,Bin,Cr\,Bin}$$

Equation 1

For the first frame in which a tracked face generates a histogram, the rolling average histogram bin contents are seeded with the frame histogram values to avoid the slow step response of Equation 1.

A modal chrominance color is then obtained for each average two-dimensional histogram by peak value search. By maintaining histograms independently of specific luminance (Y) values, a degree of lighting invariance is imparted to the algorithm. In addition, misalignment of the upper torso template with respect to the body below the detected face can be tolerated, as the dominant color is resolved correctly despite contamination from color data not belonging to each named body area.

In addition to two-dimensional luminance histograms, two-dimensional arrays of mean luminance are constructed for each area of analysis. The mean arrays are typically N*N elements corresponding to the same Cb and Cr bins used for the luminance histograms. In practice, the mean arrays are generated by first resetting each one. Each pixel's luminance value is then accumulated with the appropriate mean array element. After all pixels have been examined, the mean array elements are divided by corresponding bin contents in the luminance histograms, achieving the sum-divided-by-count calculation.

Each element in the current single frame mean for each of the six areas of analysis updates a corresponding element in a rolling average two-dimensional mean array according to Equation 2. For the first frame in which a tracked face generates an average luminance array, the rolling average array contents are seeded with the frame average values to avoid the slow step response of Equation 2.

$$\text{Avg.Mean}(n)|_{Cb,Cr} = 0.02 \text{Frame Mean}(n)|_{Cb,Cr} + 0.98 \text{Avg.Mean}(n-1)|_{Cb,Cr}$$

Equation 2

The color data triplet Y, Cb and Cr chosen as being most representative of each area of analysis is constituted by modal Cb and Cr values obtained by searching the rolling two-dimensional histogram, and mean Y value obtained by referencing the rolling two-dimensional mean array directly with the modal Cb, Cr choice.

Color Area Validity

While building histograms and arrays for modal chrominance and mean luminance analysis, it is possible to also produce counts for the number of pixels used in each calculation. When the subject is positioned such that their face centre causes one or more relative co-ordinates calculated from Table 3 to be outside the frame bounds, the number of pixels in each torso area defined by them is reduced or (if all four co-ordinates for a given area are illegal) zero. The proportion of valid pixels (i.e. those within the image bounds) for each area is calculated as the ratio of included pixels to the total possible number of pixels (given by the area dimensions derivable from Table 3)

When the proportion ratio is 50% or greater, a torso area is considered "frame valid" and a counter (reset to 0 when the subject first appears) is incremented. When the valid counter reaches a minimum defined value for stable color comparison (typically 10 frames) the "area valid" criterion is met.

The frame valid criterion controls the update of the calculations. Without a frame valid result, the rolling histogram and modal mean calculations (Equations 1 and 2 respectively) are not applied, i.e. the rolling average histogram and mean for frame n remain the same as those for frame n−1.

The area valid criterion controls the inclusion of its color information in the distance calculation between subjects and also in normalisation factor(s) that ensure repeatable results, described next.

Color Normalisation

Modal Cb, Cr and mean (of the mode) Y triplet data for each of the six upper torso areas is used to calculate a notional distance between pairs of subjects, where a subject is defined by its presence in a contiguous face track. This process will be described below.

Normalisation of the color data in the distance calculation is also performed to reduce the effects of video source characteristics such as color balance and contrast. The general aim of color normalisation is to increase the validity of comparisons between images from different face tracks, particularly where those images were captured by different cameras or in different lighting conditions, by removing at least some of the color differences caused by the image capture process.

During histogram creation to find the modal color for each torso area, the algorithm also calculates average values for Cb, Cr and Y. Using the mechanism previously described with reference to equation (1), the average values calculated for each frame are used to update rolling means for each torso area belonging to each subject (Equation 3).

Avg.Mean($n$)=0.02Frame Mean($n$)+0.98Avg.Mean($n$−1)   Equation 3 where n is a counter schematically indicating a frame number.

As before, Equation 3 is not applied if the torso area is not frame valid, and at the first image under consideration, the initial value of the rolling mean is set to the frame mean for that initial image, to avoid a slow step initial response.

To normalise, it has been found appropriate (through experimentation) to subtract from modal Cb, Cr and mean Y results a typical mean value for each component as this represents the notional color balance for the video source. Subsequent division by a typical variance for each component could also be applied to account for video source contrast and exposure.

To use this technique in a comparison of subjects, the set of valid torso areas common to both subjects is found first. So, for example, if the "neck" area is considered valid (the "area valid" flag is set—see above) in respect of both subjects, then that area would be included in such a set.

The color component means for each of the common valid torso areas are then combined to calculate the appropriate typical mean for the video source, as this is considered to be a good representation of foreground (i.e. subject) color and luminance. So, this process will generate an overall Cb mean, an overall Cr mean etc. The result is that each component (modal Cb, modal Cr and mean Y) for each torso area, in other words, a representative color of each image sub-area, is expressed as a difference to the overall mean (of each respective component) for all torso areas included in the subject-to-subject distance calculation—in other words, as a difference from a filtered color property.

Because the six torso areas are not all of equal size, the combination of each component mean into an overall normalising mean incorporates corrective weighting factors. For example, to find the correct combined mean of two individual data set means, the largest common factor M of both data set sizes $N_1$ and $N_2$ is first found. The smallest relative set sizes $P_1=N_1/M$ and $P_2=N_2/M$ are the weighting factors, and the corresponding divisor is $P_1+P_2$. The combined mean is then $A_1P_2+A_2P_2/(P_1+P_2)$ where $A_1$ and $A_2$ are the individual area means.

The method of finding the largest common factor is useful for limiting the restored sum sizes $A_1P_1$ and $A_2P_2$ when using integer variables having a limited word width. The largest common factor M can be calculated for the image areas given in Table 3 above to produce a set of modifying weights, as shown in Table 4 below.

The overall component means are reset and updated using Equations 4, 5 and 6.

$$Cb_{mean} = \begin{cases} Cb_{mean} + P_{Torso\,area}Cb_{Torso\,area}; & AreaValid|_{Torso\,area} = true \\ Cb_{mean}; & AreaValid|_{Torso\,area} = false \end{cases}$$   Equation 4

$$Cr_{mean} = \begin{cases} Cr_{mean} + P_{Torso\,area}Cr_{Torso\,area}; & AreaValid|_{Torso\,area} = true \\ Cr_{mean}; & AreaValid|_{Torso\,area} = false \end{cases}$$   Equation 5

$$Y_{mean} = \begin{cases} Y_{mean} + P_{Torso\,area}Y_{Torso\,area}; & AreaValid|_{Torso\,area} = true \\ Y_{mean}; & AreaValid|_{Torso\,area} = false \end{cases}$$   Equation 6

The divisor is reset and updated according to Equation 7.

$$Divisor = \begin{cases} Divisor + P_{Torso\,area}; & AreaValid|_{Torso\,area} = true \\ Divisor; & AreaValid|_{Torso\,area} = false \end{cases}$$   Equation 7

TABLE 4

Upper torso area relative weights for combined mean calculation.

| Upper torso area | Area | M (largest common factor) | P (relative weight) |
|---|---|---|---|
| Hair | $0.375F^2$ | $0.125F^2$ | 3 |
| Face | $4F^2$ | | 32 |
| Neck | $F^2$ | | 8 |
| Chest | $F^2$ | | 8 |
| Left shoulder | $1.5F^2$ | | 12 |
| Right shoulder | $1.5F^2$ | | 12 |

The final normalising Cb, Cr and Y means calculated after all six torso areas have been examined for potential inclusion (area valid) are divided by the Equation 7 divisor. By selectively combining individual valid area rolling means in this way, a foreground mean with rolling (slowly updating) dynamics can always be calculated regardless of which torso areas are valid for the subject-to-subject comparison.

Color Distance Calculation

The distance calculation uses a normalising mean for the subject to find up to six constituent valid area distances. Each constituent valid area distance is similarly derived from individual Cb, Cr and Y distances as shown in Equation 8 (using the $L_3$ norm distance).

$$\text{Distance}|_{Torso\,area} = \begin{bmatrix} (Cb\ \text{Distance}|_{Torso\,area})^3 + \\ (Cr\ \text{Distance}|_{Torso\,area})^3 + \\ (Y\ \text{Distance}|_{Torso\,area})^3 \end{bmatrix}^{1/3} \quad \text{Equation 8}$$

where:

$$Cb\ \text{Distance}|_{Torso\,area} = \left(\frac{\text{Modal}\ Cb|_{Torso\,area,Subject1} -}{\text{Normalising Mean}|_{Subject1}}\right) - \left(\frac{\text{Modal}\ Cb|_{Torso\,area,Subject2} -}{\text{Normalising Mean}|_{Subject2}}\right)$$

$$Cr\ \text{Distance}|_{Torso\,area} = \left(\frac{\text{Modal}\ Cr|_{Torso\,area,Subject1} -}{\text{Normalising Mean}|_{Subject1}}\right) - \left(\frac{\text{Modal}\ Cr|_{Torso\,area,Subject2} -}{\text{Normalising Mean}|_{Subject2}}\right)$$

$$Y\ \text{Distance}|_{Torso\,area} = \left(\frac{\text{Mean}\ Y|_{Torso\,area,Subject1} -}{\text{Normalising Mean}|_{Subject1}}\right) - \left(\frac{\text{Mean}\ Y|_{Torso\,area,Subject2} -}{\text{Normalising Mean}|_{Subject2}}\right)$$

The subject-to-subject distance is then calculated from up to six Equation 8 valid area distances as shown by Equation 9.

$$\text{Total Distance} = (1+\text{Distance}|_{Hair}) \cdot \quad \text{Equation 9}$$
$$(1+\text{Distance}|_{Face}) \cdot (1+\text{Distance}|_{Neck}) \cdot$$
$$(1+\text{Distance}|_{Chest}) \cdot (\text{Distance}|_{Shoulder})$$

where:

$$\text{Distance}|_{Shoulder} = \min \begin{bmatrix} (1+\text{Distance}_{Left\,shoulder}) \cdot (1+\text{Distance}_{Right\,shoulder}), \\ (1+\text{Distance}_{Left\,shoulder\,subject1,Right\,shoulder\,subject2}) \cdot \\ (1+\text{Distance}_{Right\,shoulder\,subject1,Left\,shoulder\,subject2}) \end{bmatrix}$$

The min function is used instead of two separate (left and right) shoulder distances in Equation 9 to prevent the possible occurrence of horizontal video source mirroring from affecting distance values for true subject matches. It also has the effect of adding further lighting invariance to the algorithm, as even under diffused illumination there is a strong tendency for a horizontal luminance gradient (specific to each video source) to exist between the subject's shoulders. The only loss of discrimination is between subjects wearing clothes with reversed but otherwise identical shoulder colors (an unlikely event).

To allow inclusion of the min function result for shoulder distance, both left and right shoulder areas for the two subjects being compared must be valid. This condition is also imposed on the normalised mean calculation.

To ensure the scale of the final distance is consistent regardless of the number N of valid torso areas used to generate it, the $N^{th}$ root is taken. This final result is then subject to threshold comparison to determine subject-to-subject matching. A distance less than a typical (relaxed) threshold of 1.09 suggests the two subjects being compared are the same person. Thresholds as low as 1.05 can be used but lighting variation (color balance, etc) is more likely to prevent this distance value being reached for true matches, despite the techniques included in the algorithm to reduce illumination sensitivity.

Texture Similarity

Some experimental work has been carried out to establish a reliable method of matching subjects using clothing texture. The chosen algorithm uses detection of edges in the garment or garments covering the upper torso area to build a shape representation that is sufficiently unique for each subject.

Texture Analysis Area

Texture analysis adds a single overlapping area to the six already defined and used for color analysis. Assuming the face centre is (0,0), the face size is the same in X and Y and extends from −F to +F (F is the half range value) and that larger values of Y reference points further down the torso away from the head, the co-ordinates for the new area is shown in Table 5:

TABLE 5

Upper torso area of analysis for texture similarity.

| Upper torso area | Left edge (X) | Right edge (X) | Top edge (Y) | Bottom edge (Y) |
|---|---|---|---|---|
| Chest/Shoulder Texture | −1.5F | 1.5F | F | 3F |

A typical result for face detection on live color video followed by mapping of the texture upper torso area onto the image (using the relative co-ordinates given in Table 5) is shown in FIG. 7.

The upper torso template shown in FIG. 7 varies in proportion to the detected face size. Even if a subject is largely unmoving in a live video sequence, marginal face detection probabilities at two or more consecutive scales will compete to be the strongest detections causing rapid changes in template positioning and size by the ratio $\sqrt[4]{2}(\approx 1.189)$. Therefore, a method of texture analysis that is invariant to small changes in size and position is advantageous.

Texture Analysis Attribute Generation

The method used to extract texture information from the area of analysis is based on detecting edges within a luminance-only representation.

The Sobel operator consists of a pair of 3*3 coefficient convolution kernels capable of discerning horizontal and vertical edges in luminance image data. The Gx and Gy kernel coefficients are shown in FIGS. 8a and 8b.

After separate convolution of the Gx and Gy kernels with luminance pixel data, the magnitude (strength) of the (angle invariant) edge at any point is given by Equation 10.

$$\text{Mag}_{(x,y)} = \sqrt{Gx_{(x,y)}^2 + Gy_{(x,y)}^2} \quad \text{Equation 10}$$

Similarly, the angle (theta, radians) of the (magnitude invariant) edge at any point is given by Equation 11.

$$\theta_{(x,y)} = \tan^{-1}(Gy_{(x,y)}/Gx_{(x,y)}) \quad \text{Equation 11}$$

To impart a degree of lighting invariance to the algorithm, the magnitude function is used to select only the strongest 10% of detected edge pixels to include in the texture attributes generated for each subject. This method of selecting a threshold derived from the current edge magnitude distribution affords some adaptability to absolute image contrast (linked to illumination level) while maintaining the benefit of a fixed level threshold, namely the removal of weak edges generated by noise and other fine detail that would otherwise reduce how closely edge information describes the subject.

The angle resolved by Equation 11 for each of the strongest 10% of edge pixels ranges from −π/2 radians to +π/2 radians.

This range is offset by the addition of π/2 radians to each angle and the resulting distribution in the range 0 to π radians is used to populate a histogram with typically 50 equally sized bins.

By using angle rather than magnitude information for attribute generation, spatial (scale and position) invariance is achieved for all edges completely encapsulated by the area of texture analysis.

Texture Analysis Attribute Normalisation

Texture analysis scale invariance for distance calculations between subjects requires that attribute histograms of edge angles be normalised by the amount of information each contains. For example, as the area of analysis for texture varies with face size, the number of edge pixels within the 10% magnitude threshold changes and histogram population can be significantly different to the number included for another subject whose face is detected at a different scale. Histogram normalisation is achieved in practice by dividing each bin count by the total count for all bins in the histogram. Normalisation should be carried out for all histogram data prior to average normalisation and distance calculations.

Furthermore, from the initial investigation into edge detection texture analysis, it was found that angle distribution was dominated by edges with angles at or around −π/2 radians, 0 radians and +π/2 radians. These angles correspond to edges that are vertical or near vertical with anticlockwise rotation, horizontal or near horizontal with anticlockwise or clockwise rotation and vertical or near vertical with clockwise rotation respectively. This result is to be expected as shoulder edges and the (very common) garment edge along the buttoning seam exist for many if not all of the subjects analysed.

Since it is other edge angle information that is more likely to be unique to each subject, normalisation of each subject's attribute histogram by the average angle distribution histogram causes de-emphasis of dominant vertical and horizontal edges and emphasis of edges with other angles.

Figure 9:
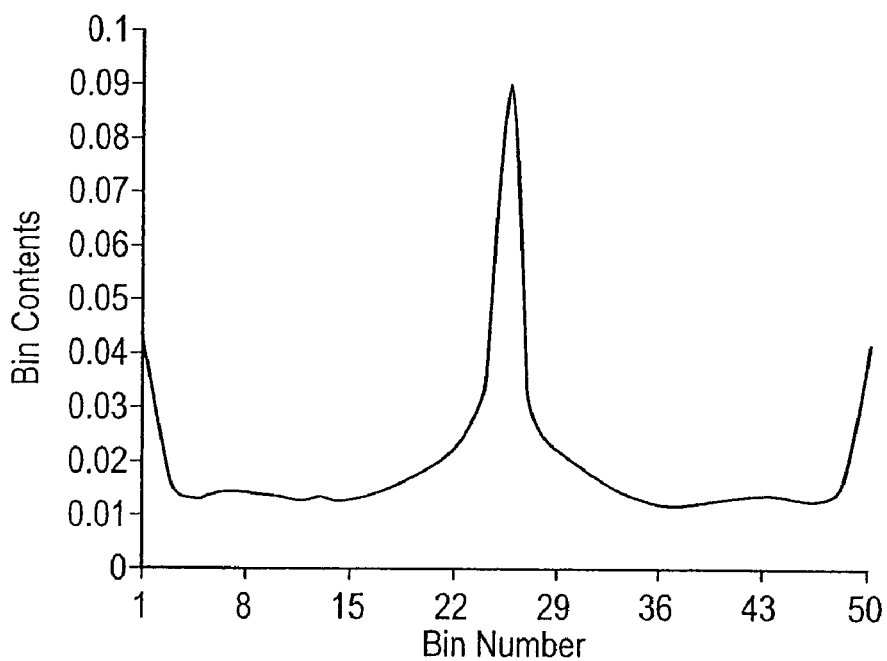
FIG. 9 schematically illustrates an attribute histogram.

FIG. 9 shows an average histogram generated by an initial pass of the attribute generation algorithm for a suitably large test set. Normalisation by the average histogram is affected by simple division of each bin value in a subject's histogram by the corresponding bin value.

Texture Distance Calculation

After normalisation according to the method described above, the distance calculation between subject attribute histograms is straightforward, and involves calculation of the RMS (Root-Mean-Square) error as described by Equation 12.

$$\text{Distance} = \sqrt{\frac{\sum_{bin=1}^{bin=50} \left( \frac{\text{Histogram}|_{subject1,bin}}{\text{Histogram}|_{subject2,bin}} - 1 \right)^2}{50}} \quad \text{Equation 12}$$

Geometric Similarity

An investigation into the suitability of subject geometry measuring the size and shape of the upper torso area was carried out. The scope of the final algorithm was limited to finding a measure (relative to the face size) representative of the position in X of the subject's left and right arm and the position in Y of the subject's left and right shoulder. These allowed calculation of a torso width and height as subject attributes. In addition, due to the way in which reliable width and height measurements were obtained from source video, the angles of the subject's left and right arms and shoulders were also resolved and used as similarity measures.

Areas of Geometry Analysis

Four areas of the body are used for geometry analysis. These are: left vertical size area, right vertical size area, left horizontal size area and right horizontal size area. The size and position of each area of analysis are expressed relative to the subject's face using simple rectangular co-ordinates. Assuming the face centre is (0,0), the face size is the same in X and Y and extends from −F to +F (F is the half range value) and that larger values of Y reference points further down the torso away from the head, the co-ordinates for each area of analysis are as shown in Table 6.

TABLE 6

| Upper torso area | Areas of analysis for geometric similarity. | | | |
|---|---|---|---|---|
| | Left edge (X) | Right edge (X) | Top edge (Y) | Bottom edge (Y) |
| Left vert area | 2.5F | −0.5F | F | 2.5F |
| Right vert area | 0.5F | 2.5F | F | 2.5F |
| Left hor area | −3.5F | −1.5F | 2F | 3.5F |
| Right hor area | 1.5F | 3.5F | 2F | 3.5F |

A typical result for face detection on live color video followed by mapping of the various geometry analysis areas onto the image (using the relative co-ordinates given in Table 6) is shown in FIG. 10.

The template shown in FIG. 10 varies in proportion to the detected face size. Size invariance is imparted to geometric analysis by expressing the width and height subject measurements as a percentage of each analysis area size in X (in the case of width measurement) and in Y (in the case of height measurement). Supplemental angle measurements are unaffected by template scaling.

Geometry Measurement

All methods for measuring upper torso geometry require segmentation of the foreground subject from the background. To achieve this, modal color inputs from the color similarity algorithm could be used to find complete torso areas having the same color balance (within tolerance limits). In practice, subject inter-frame motion was used for foreground segmentation as this is independent of other measurements and ensures an additional element of infallibility is incorporated into a combined similarity decision.

To ensure good registration of the geometry analysis areas, only frames reporting a subject's face as detected (rather than tracked in some other way that may be subject to increased positional error) are used for motion segmentation.

Figure 11:
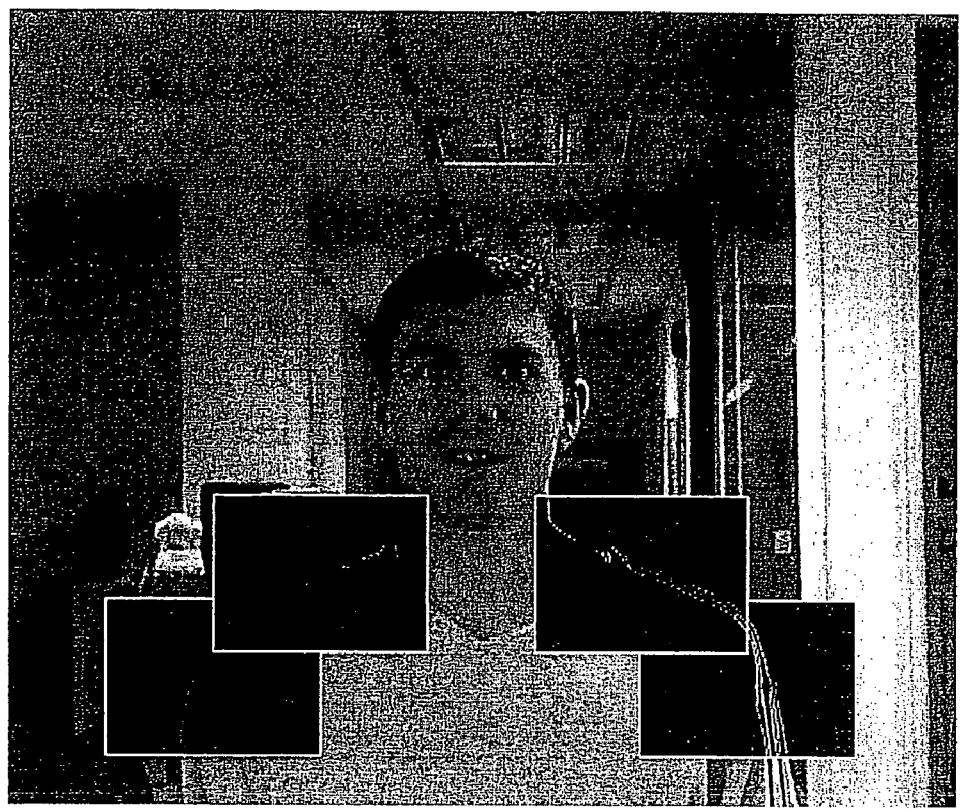
FIG. 11 schematically illustrate inter-image motion.

By providing a luminance only frame store, absolute luminance difference data can be calculated between any frame and its predecessor for which a subject's face is reported detected. An example of inter-frame motion captured using the 4 analysis areas is shown in FIG. 11.

For the areas of geometry analysis, absolute luminance difference data is subjected to a simple affine transform that effectively rotates the data around the area centre point. The transform is expressed as a 1 in N pixel shift of luminance difference data, where N ranges typically from −15 to +15 in steps of 0.1.

For left and right horizontal analysis areas and negative values of N, the luminance difference data is shifted in rows left and right by 1 pixel for every N rows above and below the centre row (respectively) the current transform output row is. This represents an anticlockwise rotation of the luminance difference data of between 3.81 (N=−15) degrees and 45 degrees (N=−1) with a non-uniform angular step size.

For positive values of N, rows are shifted right and left by 1 pixel (a reversal of the N negative case) to affect a clockwise rotation in the same range. Luminance difference data shifted rows are zero filled where appropriate.

For left and right vertical analysis areas, columns of pixels are shifted in the same way as rows for horizontal analysis areas. For both left and right horizontal and vertical areas, the affine transform parameter recorded is the value $\tan^{-1}(1/N)$, the rotation angle. Transformed luminance difference data is compared against 0. For the left and right horizontal image analysis areas, a histogram of (typically) 50 equally sized bins is populated by counting occurrences of non-zero difference data, where each bin corresponds to counts for equal ranges of pixel columns in X spanning the horizontal analysis area. For left and right vertical image analysis areas, the histograms are built from counting non-zero difference data in 50 equally spaced ranges of pixel rows in Y spanning the vertical analysis area.

Figure 12:
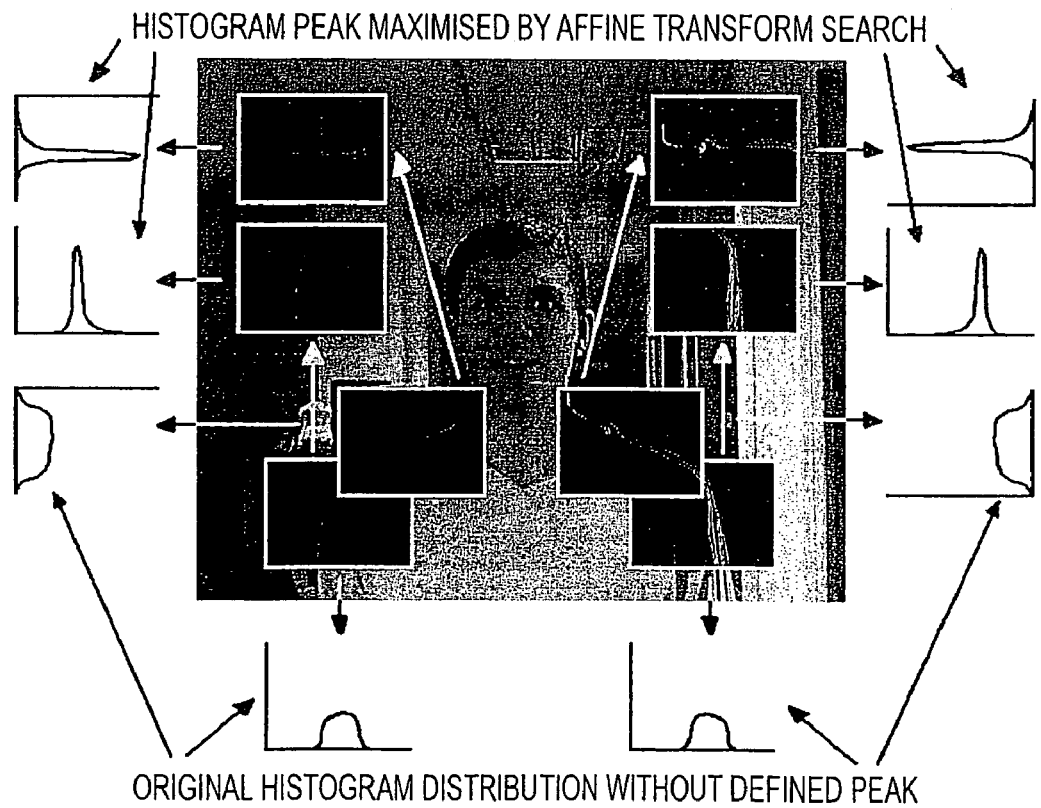
FIG. 12 schematically illustrates example histogram results for the image of FIG. 11.

As illustrated schematically in FIG. 12, a search of the 4 analysis area histograms reveals a peak bin value in each case. In combination with the application of different affine (1 in N pixel shift) transforms, the luminance difference data rotation angle that maximises the histogram bin peak value can be found for each analysis area. This represents the motion-detected edge rotation in each of the 4 cases.

In addition to the rotation angle found for each of the 4 analysis areas, the bin numbers for which each of the 4 peak values was found are also recorded.

To take advantage of temporal results (all frames in which a subject's face is detected), rolling averages of both the peak bin numbers and affine transform rotation angles for the 4 analysis areas are updated according to Equations 13 and 14.

$$\text{Avg.Bin}(n)=0.1\text{Frame Bin}(n)+0.9\text{Avg.Bin}(n-1) \qquad \text{Equation 13}$$

$$\text{Avg.}\theta(n)=0.1\text{Frame}\theta(n)+0.9\text{Avg.}\theta(n-1) \qquad \text{Equation 14}$$

Geometry Attribute Calculation

Using the rolling means for edge angles (expressed as $\tan^{-1}(1/N)$ radians) and positions (expressed as bin numbers between 1 and 50) for each of the 4 analysis areas, subject attribute calculation is straightforward.

Two independent subject distances are calculated using geometry analysis, one based on edge positions and one based on edge angles.

Subject comparisons based on edge positions involve simple Euclidean distance calculations between the each subject's shoulder height and body width (expressed as histogram bin numbers), as given by Equation 15.

$$\text{Distance} = (\text{Diff}|_{Height}^2 + \text{Diff}|_{Width}^2)^{1/2} \qquad \text{Equation 15}$$

where:

$\text{Diff}|_{Height} = \text{Height}|_{Subject1} - \text{Height}|_{Subject2}$ $\text{Diff}|_{Width} = \text{Width}|_{Subject1} - \text{Width}|_{Subject2}$ and:

$\text{Height}|_{Subject} = \dfrac{\text{Avg.Bin}|_{Left\,vert\,size\,area} + \text{Avg.Bin}|_{Right\,vert\,size\,area}}{2}$ $\text{Width}|_{Subject} = $ $\dfrac{(50 - \text{Avg.Bin}|_{Left\,hor\,size\,area}) + \text{Avg.Bin}|_{Right\,hor\,size\,area}}{}$ Subject comparisons based on edge angles again involve Euclidean distance calculations. In this case, the included angle between sloping shoulders (almost 180°) is calculated and combined with the included angle between arms (almost 0°), as shown in Equation 16.

$$\text{Dis}\tan ce=(\text{Diff}|_{Shoulder\,included\,angle}^2 + \text{Diff}|_{Arm\,included\,angle}^2)^{1/2} \qquad \text{Equation 16}$$

where, $\text{Diff}|_{Shoulder\,included\,angle} = \text{Shoulder included angle}|_{Subject\,1} - \text{Shoulder included angle}|_{Subject\,2}$ $\text{Diff}|_{Arm\,included\,angle} = \text{Arm included angle}|_{Subject\,1} - \text{Arm included angle}|_{Subject\,2}$ and, Shoulder included angle$|_{Subject}$=180+Avg.$\theta|_{Left\,hor\,size\,area}$−Avg.$\theta|_{Right\,hor\,size\,area}$ Arm included angle$|_{Subject}$=Avg.$\theta|_{Right\,hor\,size\,area}$−Avg.$\theta|_{Left\,hor\,size\,area}$ It will be appreciated that color, texture and geometry attributes could all be used in various permutations, either in respect of different (albeit possibly overlapping) detection areas or even common detection areas.

A combination of the distance results generated by the color and face algorithms to obtain a robust similarity measure may be used. The individual thresholds for face and color similarity algorithms (and/or geometrical similarity) are applied separately and a logical AND operation is used to decide if the subjects match. This allows the appropriate operating point (true acceptances versus false acceptances) to be chosen for each algorithm, avoiding the difficult problem of finding a single threshold after optimum linear/non-linear distance combination.

Other aspects of the two algorithms can also be combined, such as the minimum data criteria for a subject. A logical AND operation is performed for a subject's fulfilment of sufficient face similarity data (8 dissimilar face stamps) and color similarity data (10 frame valid results for at least one torso area) by successive frame updates. If tracking of a subject stops, it is removed from the similarity database if this AND condition is not met.

In the same way, face and color similarity algorithms can synchronise to handle merging of similarity data for two matched subjects, producing a more accurate and typical hybrid representation. While face similarity merges both face sets using a dissimilarity measure, color similarity merges (by simple averaging) color histograms and rolling means for torso areas belonging to the common set used in the distance calculation that signified the subject-to-subject match. Any torso areas that are not valid in one subject but valid in the other receive the valid histogram and mean data after merging. Finally, any torso areas that are commonly invalid remain so after merging.

Although illustrative embodiments of the invention have been described in detail herein with respect to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of processing successive images of a video signal to generate a representative color value indicative of a representative color of an image sub-area, said method comprising the steps of:
   (i) detecting a color property of said image sub-area in a current image;
   (ii) generating a filtered color property in respect of said current image by combining a color property for said current image with a filtered color property derived in respect of a corresponding sub-area of a previous image; and
   (iii) deriving said representative color value in dependence on a difference between said color property of said sub-area of said current image and said filtered color property.

2. A method according to claim 1, comprising the step of initialising said filtered color property, in respect of a first image of said successive images, to said color property detected in respect of said sub-area of that first image.

3. A method according to claim 1, in which said steps (i) to (iii) are carried out in respect of one or more color properties selected from a list comprising luminance, color difference Cb and color difference Cr.

4. A method according to claim 1, in which said steps (i) to (iii) are carried out in respect of a plural sub-areas in each image, said method comprising the step of:
   combining said representative color values generated in respect of said plural sub-areas to form a single combined representative color value indicative of a color of said plural sub-areas as a group.

5. A method according to claim 4, comprising the step of:
   weighting a contribution of each individual sub-area's color value to said combined representative color value in dependence on an area of that sub-area.

6. A method according to claim 1, comprising:
   detecting a size and position of a predetermined object in each image of said video signal; and
   defining one or more sub-areas of an image with respect to said size and position of said predetermined object in that image.

7. A method according to claim 6, in which said predetermined object represents a human face.

8. A method according to claim 7, in which said one or more sub-areas have a size and orientation, with respect to said detected predetermined object, to overlap a human torso.

9. Computer software having program code for carrying out a method according to claim 1.

10. A medium by which program code according to claim 9 is provided.

11. A medium according to claim 10, said medium being a storage medium.

12. A medium according to claim 10, said medium being a transmission medium.

13. A method of image comparison, in which a pair of images from respective video signals are compared, said comparison being with reference to one or more sub-areas of said images, said method comprising the steps of:
   detecting, in respect of said sub-area(s) of each image in said pair, a color property and a representative color value using a method according to claim 1;
   combining, for each image in said pair, said color property and said representative color value to generate a normalised color property; and
   comparing said normalised color properties derived in respect of said pair of images.

14. Apparatus for processing successive images of a video signal to generate a representative color value indicative of a representative color of an image sub-area, said apparatus comprising:
   means for detecting a color property of said image sub-area in a current image;
   means for generating a filtered color property in respect of said current image by combining a color property for said current image with a filtered color property derived in respect of a corresponding sub-area of a previous image; and
   means for deriving said representative color value in dependence on a difference between said color property of said sub-area of said current image and said filtered color property.

15. Apparatus for processing successive images of a video signal to generate a representative color value indicative of a representative color of an image sub-area, said apparatus comprising:
   a detector to detect a color property of said image sub-area in a current image;
   logic to generate a filtered color property in respect of said current image by combining a color property for said current image with a filtered color property derived in respect of a corresponding sub-area of a previous image; and
   logic to derive said representative color value in dependence on a difference between said color property of said sub-area of said current image and said filtered color property.

* * * * *